(12) United States Patent
Szilágyi et al.

(10) Patent No.: US 12,518,103 B2
(45) Date of Patent: Jan. 6, 2026

(54) METHOD AND APPARATUS FOR ANOMALY DETECTION

(71) Applicant: Nokia Solutions and Networks Oy, Espoo (FI)

(72) Inventors: Péter Szilágyi, Budapest (HU); Gabor Horvath, Budapest (HU); Attila Kadar, Budapest (HU)

(73) Assignee: Nokia Solutions and Networks Oy, Espoo (FI)

( * ) Notice: Subject to any disclaimer, the term of this patent is extended or adjusted under 35 U.S.C. 154(b) by 294 days.

(21) Appl. No.: 18/188,677

(22) Filed: Mar. 23, 2023

(65) Prior Publication Data

US 2023/0412627 A1  Dec. 21, 2023

(30) Foreign Application Priority Data

Jun. 10, 2022 (EP) .................................. 22178500

(51) Int. Cl.
   *G06F 11/00* (2006.01)
   *G06F 11/07* (2006.01)
   (Continued)

(52) U.S. Cl.
   CPC .......... *G06F 40/30* (2020.01); *G06F 11/0766* (2013.01); *G06F 11/0793* (2013.01);
   (Continued)

(58) Field of Classification Search
   CPC ............ G06F 11/0766; G06F 11/0793; G06F 11/3476
   See application file for complete search history.

(56) References Cited

U.S. PATENT DOCUMENTS 11,860,756 B2 *   1/2024   Yeddu ................... G06F 40/242
12,026,046 B2 *   7/2024   Friedrich ............... G06N 3/088
(Continued)

FOREIGN PATENT DOCUMENTS

CN          114118295 A       3/2022

OTHER PUBLICATIONS

"Zero-touch network and Service Management (ZSM); Reference Architecture", ETSI GS ZSM 002, V1.1.1, Aug. 2019, pp. 1-80.
(Continued)

*Primary Examiner* — Amine Riad
(74) *Attorney, Agent, or Firm* — Harness, Dickey & Pierce, P.L.C

(57) ABSTRACT

An apparatus for anomaly detection, the apparatus comprising means for:

Collecting a plurality of log messages from a data processing system, log messages comprising textual content and numeric attributes, Classifying the plurality of log messages into a plurality of clusters as a function of a number of the numeric attributes in the log messages, such that the log messages within a cluster have a given number of the numeric attributes, For at least one of the clusters, computing at least one encoding vector associated to a numeric attribute, Computing a combined semantic embedding vector from the textual contents of the plurality of log messages, (Continued)

Combining the at least one encoding vector with the combined semantic embedding vector into a final encoding vector, and Feeding the final encoding vector to an anomaly detection module intended to detect an anomaly in the data processing system.

18 Claims, 4 Drawing Sheets

(51) Int. Cl.
  *G06F 11/34* (2006.01)
  *G06F 16/35* (2019.01)
  *G06F 40/30* (2020.01)
  *G06F 40/284* (2020.01)

(52) U.S. Cl.
  CPC .......... *G06F 11/3476* (2013.01); *G06F 16/35* (2019.01); *G06F 40/284* (2020.01)

(56) References Cited

U.S. PATENT DOCUMENTS

| | | | |
|---|---|---|---|
| 2019/0050747 A1 | 2/2019 | Nakamura et al. | |
| 2019/0149565 A1 | 5/2019 | Hagi et al. | |
| 2019/0303727 A1* | 10/2019 | Foroughi | G06N 7/01 |
| 2020/0159826 A1* | 5/2020 | Lev Tov | G06F 40/35 |
| 2020/0382536 A1 | 12/2020 | Dherange et al. | |
| 2021/0174253 A1 | 6/2021 | Moore et al. | |
| 2022/0019914 A1 | 1/2022 | James et al. | |
| 2023/0137235 A1* | 5/2023 | Chen | G06F 11/3476 714/37 |
| 2023/0177380 A1* | 6/2023 | Bansal | G06N 20/00 706/12 |
| 2025/0028752 A1* | 1/2025 | Lauber | G06F 40/30 |

OTHER PUBLICATIONS

Sundararaman et al., "Methods for Numeracy-Preserving Word Embeddings", Proceedings of the 2020 Conference on Empirical Methods in Natural Language Processing (EMNLP), Nov. 16-20, 2020, pp. 4742-4753.

"BERT language model", Tech Target, Mar. 7, 2022, Webpage archive available at :http://web.archive.org/web/20220307180514/https://www.techtarget.com/searchenterpriseal/definition/BERT-language-model.

Kim et al., "Intrusion Detection Based on Sequential Information Preserving Log Embedding Methods and Anomaly Detection Algorithms", IEEE Access, vol. 9, Apr. 8, 2021, pp. 58088-58101.

Extended European Search Report received for corresponding European Patent Application No. 22178500.9, dated Jan. 10, 2023, 8 pages.

Kim et al., "seq2vec: Analyzing sequential data using multi-rank embedding vectors", Electronic Commerce Research and Applications, vol. 43, Sep.-Oct. 2020, pp. 1-15.

* cited by examiner

METHOD AND APPARATUS FOR ANOMALY DETECTION

FIELD

The disclosure relates to apparatuses and methods for jointly processing semantic and numeric information, in particular output messages generated by a software.

BACKGROUND

Natural language processing is a set of techniques used to analyze text data. In particular, semantic embeddings are data processing techniques used to preserve semantic relationships between words or groups of words.

The algorithm word2vec can be used to build semantic embeddings. Alternatively, models like Bidirectional Encoder Representation from Transformers (BERT) can also be used.

However, these techniques cannot be applied to numeric attributes within text, leading to difficulties extracting meaning from a text, as the numeric attributes influence the overall meaning of a text.

Thus, there is a need for apparatuses and methods which can jointly process semantic information and numeric attributes.

SUMMARY

In some embodiments, the disclosure provides an apparatus for anomaly detection. The apparatus comprises means for:

Collecting a plurality of log messages from a data processing system, the log messages reporting events that occur as the data processing system operates, the log messages comprising textual content and numeric attributes, Classifying the plurality of log messages into a plurality of clusters as a function of a number of the numeric attributes in the log messages, such that the log messages within a cluster have a given number of the numeric attributes, For at least one of the clusters, computing at least one encoding vector associated to a numeric attribute, wherein the at least one encoding vector is computed as a function of a representative value of the numeric attribute across a plurality of the log messages within the cluster and of a rank of the numeric attribute, wherein the rank is representative of an order of the numeric attribute within the given number of the numeric attributes of the log messages within the cluster, Computing a combined semantic embedding vector from the textual contents of the plurality of log messages, Combining the at least one encoding vector with the combined semantic embedding vector into a final encoding vector, and Feeding the final encoding vector to an anomaly detection module intended to detect an anomaly in the data processing system.

Thanks to these features, information stemming from both textual contents and numeric attributes may be jointly processed and used to detect an anomaly in the plurality of log messages. Furthermore, the anomaly detection module may have a better performance as it receives data under a vectorized format, and not directly character strings.

In an example embodiment, the apparatus includes the anomaly detection module.

In an embodiment, the combined semantic embedding vector is computed using a semantic embedding algorithm, such as word2vec or a Bidirectional Encoder Representations from Transformers (BERT) model.

In some embodiments, such an apparatus may optionally comprise one or more of the features below.

In an example embodiment, the apparatus further comprises means for computing at least one encoding vector associated to a numeric attribute for a plurality of the clusters.

In an example embodiment, the apparatus further comprises means for computing a plurality of encoding vectors associated to a plurality of numeric attributes for at least one of the clusters.

In an example embodiment, the apparatus further comprises means for combining the plurality of encoding vectors with the combined semantic embedding vector into the final encoding vector.

In an example embodiment, the apparatus comprises means for computing at least one additional numeric attribute from the log messages of at least one of the clusters, and for appending the at least one additional numeric attribute to the numeric attributes within the at least one of the clusters and increasing the given number of the numeric attributes of the log messages within the cluster.

Thanks to these features, patterns in the plurality of log messages may be analyzed in order to detect an anomaly, such as, for example, a time difference between two given messages or a number of occurrences of a given keyword.

In an example embodiment, the means for classifying the plurality of log messages into a plurality of clusters are configured to compute the plurality of clusters as a function of the textual contents in the log messages.

Thanks to this feature, messages with similar textual contents may be processed within a given cluster. Moreover, it allows messages within one cluster to have comparable numeric attributes, with a same number of numeric attributes across the given cluster.

In an example embodiment, the apparatus comprises means for computing a plurality of semantic embedding vectors from the textual contents and for combining the plurality of semantic embedding vectors into the combined semantic embedding vector.

In an example embodiment, the means for computing at least one encoding vector are configured to convert the plurality of average values into high dimensional polar coordinates.

Thanks to this feature, the plurality of average values may be put under a vectorized format and can subsequently be combined with the combined semantic embedding vector.

In an example embodiment, the means for computing at least one encoding vector are configured to compute an intermediate encoding vector from the representative value of the numeric attribute and to select a projection vector within a basis of orthogonal vectors as a function of the rank of the numeric attribute and to compute the encoding vector by projecting the intermediate encoding vector on the projection vector.

In an example embodiment, the means for computing at least one encoding vector are configured to compute a transitional encoding vector from the representative value of the numeric attribute and to multiply at least one coordinate of the transitional encoding vector by a factor depending on an index of the at least one coordinate and the rank of the numeric attribute.

Thanks to these features, the index of the at least one coordinate and the rank of the numeric attribute are encoded within the encoding vector. These features prevent a loss of positional information relating to the numeric attribute, which leads to a more accurate anomaly detection module.

In an example embodiment, the apparatus comprises means for returning an anomaly detection signal to the data processing system in order to cause a corrective action in the data processing system, the anomaly detection signal being computed by the anomaly detection module.

In an example embodiment, the anomaly detection module is an autoencoder.

Thus, the anomaly detection module may rely on unsupervised learning to detect anomalies and may not need labeled examples of anomalies.

In some example embodiments, the anomaly detection module may also rely on other unsupervised methods, such as Principal Components Analysis.

In an example embodiment, the apparatus comprises means for receiving a reconstruction loss computed by the autoencoder and for classifying a value of the reconstruction loss higher than an anomaly threshold as an anomaly.

Thanks to this feature, an anomaly may be detected if the final encoding vector fed into the anomaly detection module differs from a standard distribution of data learnt in an unsupervised fashion by the anomaly detection module.

In an example embodiment, the apparatus comprises means for training the anomaly detection module using a plurality of training encoding vectors, the plurality of training encoding vectors being computed from a training dataset of log messages.

In some example embodiments, the disclosure also provides a method for anomaly detection, the method comprising the steps of:

Collecting a plurality of log messages from a data processing system, the log messages reporting events that occur as the data processing system operates, the log messages comprising textual content and numeric attributes, Classifying the plurality of log messages into a plurality of clusters as a function of a number of the numeric attributes in the log messages, such that the log messages within a cluster have a given number of the numeric attributes, For at least one of the clusters, computing at least one encoding vector associated to a numeric attribute, wherein the at least one encoding vector is computed as a function of a representative value of the numeric attribute across a plurality of the log messages within the cluster and of a rank of the numeric attribute, wherein the rank is representative of an order of the numeric attribute within the given number of the numeric attributes of the log messages within the cluster, Computing a combined semantic embedding vector from the textual contents of the plurality of log messages, Combining the at least one encoding vector with the combined semantic embedding vector into a final encoding vector, and Feeding the final encoding vector to an anomaly detection module intended to detect an anomaly in the data processing system.

In some embodiments, such method may optionally comprise one or more of the features below.

In an example embodiment, the method further comprises the step of returning an anomaly detection signal representing the anomaly.

In an example embodiment, the method further comprises the step of performing corrective action as a function of the anomaly detection signal.

In an example embodiment, the corrective action is performed in the data processing system.

Thanks to this feature, anomalies in the data processing system may be corrected automatically and without supervision, allowing a better performance of the data processing system.

In an example embodiment, the method comprises computing at least one encoding vector associated to a numeric attribute for a plurality of the clusters.

In an example embodiment, the method comprises computing a plurality of encoding vectors associated to a plurality of numeric attributes for at least one of the clusters.

In an example embodiment, the method comprises combining the plurality of encoding vectors with the combined semantic embedding vector into the final encoding vector.

In an example embodiment, the method comprises computing at least one additional numeric attribute from the log messages of at least one of the clusters, and appending the at least one additional numeric attribute to the numeric attributes within the at least one of the clusters and increasing the given number of the numeric attributes of the log messages within the cluster.

In an example embodiment, the method comprises computing a plurality of semantic embedding vectors from the textual contents and combining the plurality of semantic embedding vectors into the combined semantic embedding vector.

In an example embodiment, the method comprises returning an anomaly detection signal to the data processing system in order to cause corrective action in the data processing system, the anomaly detection signal being computed by the anomaly detection module.

In an example embodiment, the method comprises receiving a reconstruction loss computed by the autoencoder and classifying a value of the reconstruction loss higher than an anomaly threshold as an anomaly.

In an example embodiment, the method comprises training the anomaly detection module using a plurality of training encoding vectors, the plurality of training encoding vectors being computed from a training dataset of log messages.

In some embodiments, the invention provides a non-transitory computer readable medium comprising program instructions for causing an apparatus to perform the above method.

In some example embodiments, the means in the apparatus further comprises:

At least one processor; and

At least one memory including a computer program code, the at least one memory and computer program code configured to, with the at least one processor, cause operations of the apparatus.

The at least one memory and the computer program code may be configured to, with the at least one processor, cause the apparatus to:

Collect a plurality of log messages from a data processing system, the log messages reporting events that occur as the data processing system operates, the log messages comprising textual content and numeric attributes, Classify the plurality of log messages into a plurality of clusters as a function of a number of the numeric attributes in the log messages, such that the log messages within a cluster have a given number of the numeric attributes, For at least one of the clusters, compute at least one encoding vector associated to a numeric attribute, wherein the at least one encoding vector is computed as a function of a representative value of the numeric attribute across a plurality of the log messages within the cluster and of a rank of the numeric attribute, wherein the rank is representative of an order of the numeric attribute within the given number of the numeric attributes of the log messages within the cluster, Compute a combined semantic embedding vector from the textual contents of the plurality of log messages, Combine the at least one encoding vector with the combined semantic embedding vector into a final encoding vector, and Feed the final encoding vector to an anomaly detection module intended to detect an anomaly in the data processing system.

The at least one memory and the computer program code may further be configured to, with the at least one processor, cause the apparatus to compute at least one encoding vector associated to a numeric attribute for a plurality of the clusters.

The at least one memory and the computer program code may further be configured to, with the at least one processor, cause the apparatus to compute a plurality of encoding vectors associated to a plurality of numeric attributes for at least one of the clusters.

The at least one memory and the computer program code may further be configured to, with the at least one processor, cause the apparatus to combine the plurality of encoding vectors with the combined semantic embedding vector into the final encoding vector.

The at least one memory and the computer program code may further be configured to, with the at least one processor, cause the apparatus to compute at least one additional numeric attribute from the log messages of at least one of the clusters, and to append the at least one additional numeric attribute to the numeric attributes within the at least one of the clusters and increasing the given number of the numeric attributes of the log messages within the cluster.

The at least one memory and the computer program code may further be configured to, with the at least one processor, cause the apparatus to compute a plurality of semantic embedding vectors from the textual contents and to combine the plurality of semantic embedding vectors into the combined semantic embedding vector.

The at least one memory and the computer program code may further be configured to, with the at least one processor, cause the apparatus to return an anomaly detection signal to the data processing system in order to cause corrective action in the data processing system, the anomaly detection signal being computed by the anomaly detection module.

The at least one memory and the computer program code may further be configured to, with the at least one processor, cause the apparatus to receive a reconstruction loss computed by the autoencoder, and to classify a value of the reconstruction loss higher than an anomaly threshold as an anomaly.

The at least one memory and the computer program code may further be configured to, with the at least one processor, cause the apparatus to train the anomaly detection module using a plurality of training encoding vectors, the plurality of training encoding vectors being computed from a training dataset of log messages.

In some example embodiments, the disclosure also provides an apparatus comprising:

A collecting circuitry configured to collect a plurality of log messages from a data processing system, the log messages reporting events that occur as the data processing system operates, the log messages comprising textual content and numeric attributes, A classifying circuitry configured to classify the plurality of log messages into a plurality of clusters as a function of a number of the numeric attributes in the log messages, such that the log messages within a cluster have a given number of the numeric attributes, A first computing circuitry configured to compute, for at least one of the clusters, at least one encoding vector associated to a numeric attribute, wherein the at least one encoding vector is computed as a function of a representative value of the numeric attribute across a plurality of the log messages within the cluster and of a rank of the numeric attribute, wherein the rank is representative of an order of the numeric attribute within the given number of the numeric attributes of the log messages within the cluster, A second computing circuitry configured to compute a combined semantic embedding vector from the textual contents of the plurality of log messages, A first combining circuitry configured to combine the at least one encoding vector with the combined semantic embedding vector into a final encoding vector, and A feeding circuitry configured to feed the final encoding vector to an anomaly detection module intended to detect an anomaly in the data processing system.

In an example embodiment, the disclosure also provides an apparatus further comprising a third computing circuitry configured to compute at least one encoding vector associated to a numeric attribute for a plurality of the clusters.

In an example embodiment, the disclosure also provides an apparatus further comprising a fourth computing circuitry configured to compute a plurality of encoding vectors associated to a plurality of numeric attributes for at least one of the clusters.

In an example embodiment, the disclosure also provides an apparatus further comprising a second combining circuitry configured to combine the plurality of encoding vectors with the combined semantic embedding vector into the final encoding vector.

In an example embodiment, the disclosure also provides an apparatus further comprising a fifth computing circuitry configured to compute at least one additional numeric attribute from the log messages of at least one of the clusters, and to append the at least one additional numeric attribute to the numeric attributes within the at least one of the clusters and increasing the given number of the numeric attributes of the log messages within the cluster.

In an example embodiment, the disclosure also provides an apparatus further comprising a sixth computing circuitry configured to compute a plurality of semantic embedding vectors from the textual contents and to combine the plurality of semantic embedding vectors into the combined semantic embedding vector.

In an example embodiment, the disclosure also provides an apparatus further comprising a returning circuitry configured to return an anomaly detection signal to the data processing system in order to cause corrective action in the data processing system, the anomaly detection signal being computed by the anomaly detection module.

In an example embodiment, the disclosure also provides an apparatus further comprising a classifying circuitry configured to receive a reconstruction loss computed by the autoencoder, and to classify a value of the reconstruction loss higher than an anomaly threshold as an anomaly.

In an example embodiment, the disclosure also provides an apparatus further comprising a training circuitry configured to train the anomaly detection module using a plurality of training encoding vectors, the plurality of training encoding vectors being computed from a training dataset of log messages.

BRIEF DESCRIPTION OF THE DRAWINGS

These and other aspects of the invention will be apparent from and elucidated with reference to example embodiments described hereinafter, by way of example, with reference to the drawings.

DETAILED DESCRIPTION OF THE EMBODIMENTS

Figure 1:
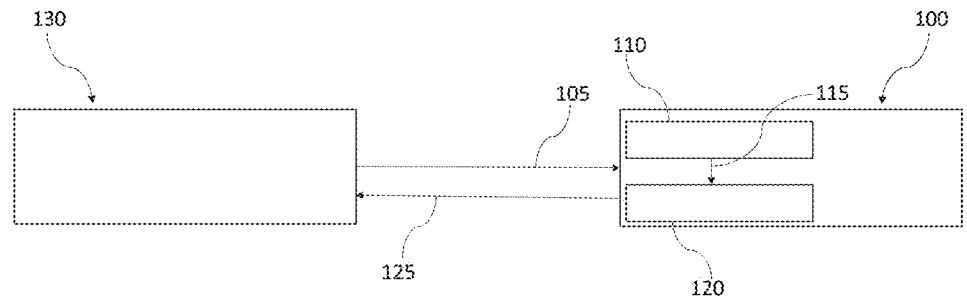
FIG. 1 represents a schematic view of an interaction between a computer and an anomaly detection system according to an embodiment.

FIG. 1 represents a schematic view of a computer 130 in communication with an anomaly detection system 100. The computer 130 sends log messages 105 to the anomaly detection system 100. The anomaly detection system 100 comprises a data processing unit 110 and an anomaly detection unit 120.

The log messages 105 are a stream of data generated by an operating system or a software on the computer 130. Each log message 105 may have a text content and may possess one or more numeric attributes. The log messages may comprise timestamps, each of the log messages being associated to a timestamp.

The text content of the log messages may be intelligible to a human operator. The text content may vary within a finite number of possibilities and may comprise keywords such as "error", "warning", "success" or "failed". The log messages may be used to monitor events happening during an operating of the computer 130.

The one or more numeric attributes of the log messages 105 may comprise one or more of the following:
an event identifier, for example an error identifier,
a measurement of a feature relevant to the operations of the computer, for example
a runtime,
a value of CPU load or a value of memory usage caused by execution of a software module,
a performance counter, such as a number of users served, a number of signaling transactions performed between two software components, and
an amount of data exchanged between two applications or transferred to a user.

The data processing unit 110 receives the log messages 105 and processes them. In the event where a specific log message exceeds a given length, the data processing unit 110 may split the specific log message in a plurality of sub-messages, the sub-messages being then processed as individual log messages. The sub-messages may have different lengths.

The data processing unit 110 transmits an encoding vector 115 to the anomaly detection unit 120. The encoding vector 115 encodes the semantic and numeric information contained within the log messages 105. The encoding vector 115 is a high-dimensional numeric vector.

The anomaly detection unit 120 uses an anomaly detection algorithm. Examples of suitable algorithms comprise Principal Components Analysis or Local Outlier Factor. The anomaly detection unit 120 may also comprise an artificial neural network trained on a training dataset of encoding vectors. The artificial neural network may rely on unsupervised learning. According to an embodiment, the artificial neural network may be an autoencoder.

The anomaly detection unit 120 outputs an anomaly signal 125, the anomaly signal 125 classifying the encoding vector as anomalous or not. The anomaly signal 125 may be sent back to the computer 130 to trigger a corrective action performed by the computer 130. For example, the computer 130 may run an automatic correction script or an antivirus. The anomaly detection unit 120 or computer 130 may also notify a human operator, such as a network administrator, about the anomaly.

Figure 2:
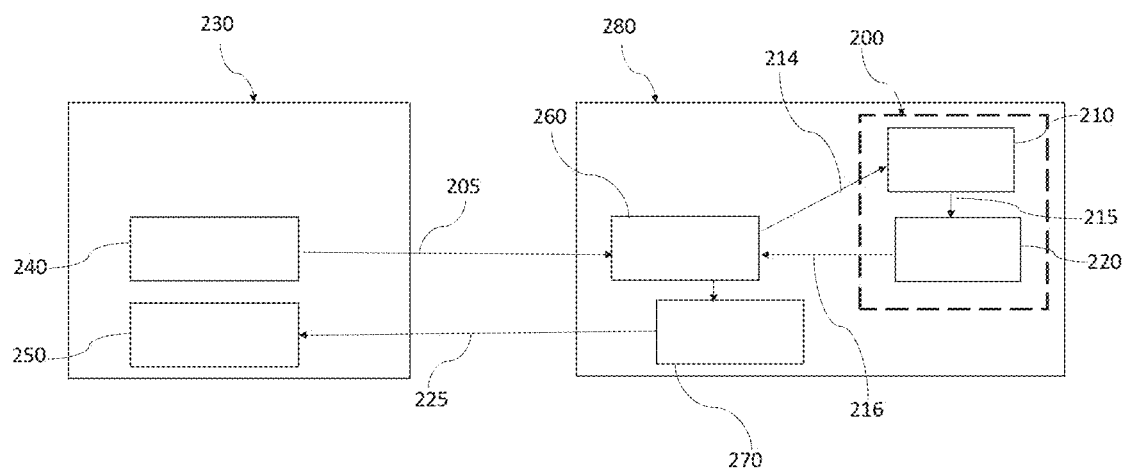
FIG. 2 represents a schematic view of an interaction between a local network and a remote computing infrastructure in which embodiments of the invention may be implemented.

FIG. 2 represents a schematic view of the invention according to another embodiment. A local infrastructure 230 is connected to a remote computing infrastructure 280. The local infrastructure 230 may be a computer or a local network. The local infrastructure 230 may comprise a distributed architecture with a plurality of computers and/or data processing systems.

The remote computing infrastructure 280 may for example be a Web-hosted software or a cloud computing service. The remote computing infrastructure 280 may be used to perform Security Information and Event Management (SIEM), which comprises a task of detecting anomalous events in the local infrastructure 230. Examples of anomalous events include unauthorized connections, unauthorized file sharing or modification, or an exploitation of a vulnerability. The anomalous events may be caused by malwares or computer viruses.

The remote computing infrastructure 280 may serve to perform detection of denial of service attacks or detection of changed software execution path, which might be an indication of a corrupted or virus-infected software. Moreover, the remote computing infrastructure 280 may detect user activity through commands executed and logged through a user interface.

The remote computing infrastructure 280 may also be used beyond the field of cybersecurity. The remote computing infrastructure 280 may serve to detect an abnormal behavior in software, which might signal a bug or an incorrect configuration. In an embodiment, the remote computing infrastructure 280 may monitor end user activity, for example on mobile phone users.

The local infrastructure 230 comprises a data collector 240. The data collector 240 collects log messages 205 generated by the local infrastructure 230 as it operates. The data collector 240 sends the log messages 205 to the remote computing infrastructure 280 using a secure, encrypted connection. A data repository 260 within the remote computing infrastructure 280 receives and stores the log messages 205.

The data repository 260 operates as a storage device for the log messages 205. The data repository 260 may also compute aggregated metrics about the plurality of log messages, such as a number of messages, a number of occurrences of a given keyword.

The data repository 260 transmits a batch 214 of log messages to an anomaly detection system 200. A data processing unit 210 receives the batch 214, and outputs an encoding vector 215, the encoding vector 215 being fed into an anomaly detection unit 220. The anomaly detection unit 220 then outputs an anomaly signal 216, the anomaly signal 216 classifying the batch 214 as anomalous or normal. The anomaly signal 216 is sent back to the data repository 260.

The data repository 260 may transmit the anomaly signal to an extended Detection and Response layer, or XDR layer 270. The XDR layer 270 performs a cybersecurity analysis of the log messages, including extracting meaning from data and detecting threats. The anomaly signal 216 helps the XDR layer 270 in a detection of threats.

The XDR layer 270 may send instructions 225 to a remediation agent 250. The remediation agent 250 may perform a corrective action in order to remedy the anomaly.

Figure 3:
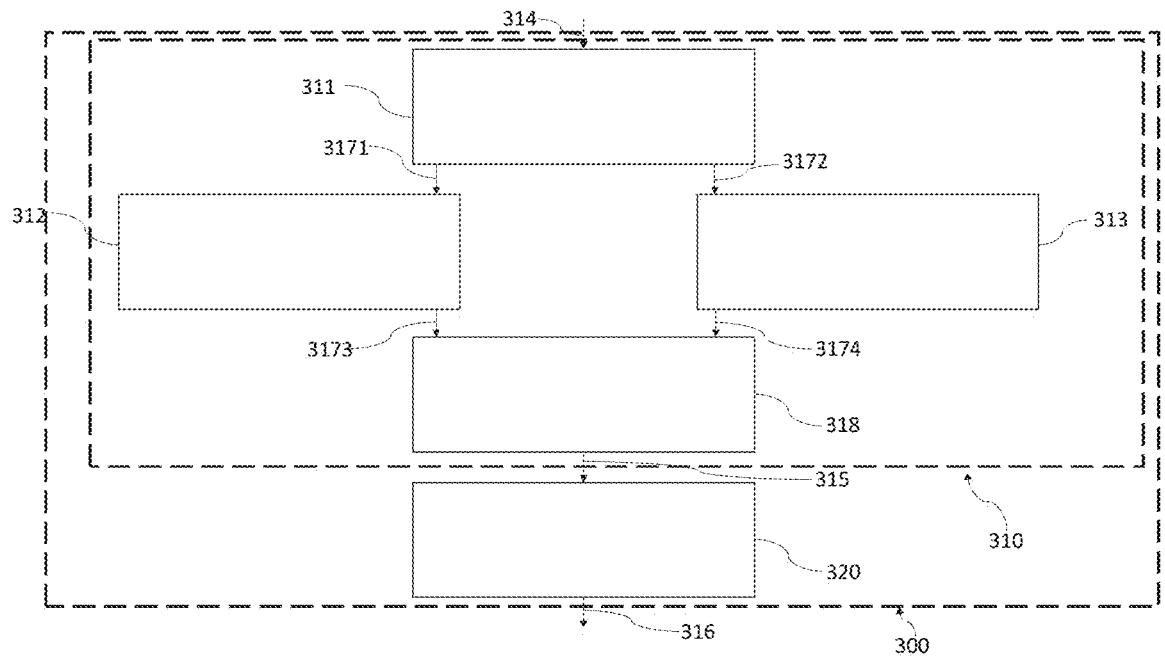
FIG. 3 represents a schematic view of the anomaly detection system.

FIG. 3 represents a schematic view of an anomaly detection apparatus 300. The anomaly detection apparatus 300 comprises a data processing unit 310 and an anomaly detection unit 320. A batch of N log messages 314 is received by the data processing unit 310 from a computer 110 or a local infrastructure 230.

The batch of N log messages 314 first goes through a data formatting step 311. A text content 3171 and numeric attributes 3172 from the batch of N log messages 314 are separated. A separation of the text content 3171 and numeric attributes 3172 may be performed by using the ASCII codes of each character. The batch of N log messages 314 may be tokenized into the text content 3171 and the numeric attributes 3172 using regular expressions. At least one regular expression matches the text content 3171 to a first character set, such as, for example "[a-z, A-Z]+". At least one other regular expression also matches the numeric attributes 3172 to a second character set, such as, for example "[0-9.–]+".

The text content 3171 is then received by a semantic branch 312. The semantic branch 312 computes a semantic embedding vector 3173.

The numeric attributes 3172 are received by a numeric branch 313. The numeric branch 313 computes a numeric encoding vector 3174.

A combination unit 318 receives the semantic embedding vector 3173 and the numeric encoding vector 3174 and combines them into a final encoding vector 315. According to an embodiment, the semantic embedding vector 3173 and the numeric encoding vector 3174 have the same dimension. The semantic embedding vector 3173 and the numeric encoding vector 3174 may then be combined using an operation among a sum, a weighted sum, an arithmetic average, a geometric average, a harmonic average, a quadratic average or a concatenation.

According to an embodiment, the semantic embedding vector 3173 and the numeric encoding vector 3174 are concatenated to compute the final encoding vector 315.

The final encoding vector 315 may also be computed by adding a constant to or multiplying by a constant a combination of the semantic embedding vector 3173 and of the numeric encoding vector 3174.

The final encoding vector 315 is then received by the anomaly detection unit 320. The anomaly detection unit 320 then computes an anomaly signal 316, the anomaly signal conveying whether the batch of N log messages 314 is anomalous or not.

Figure 4:
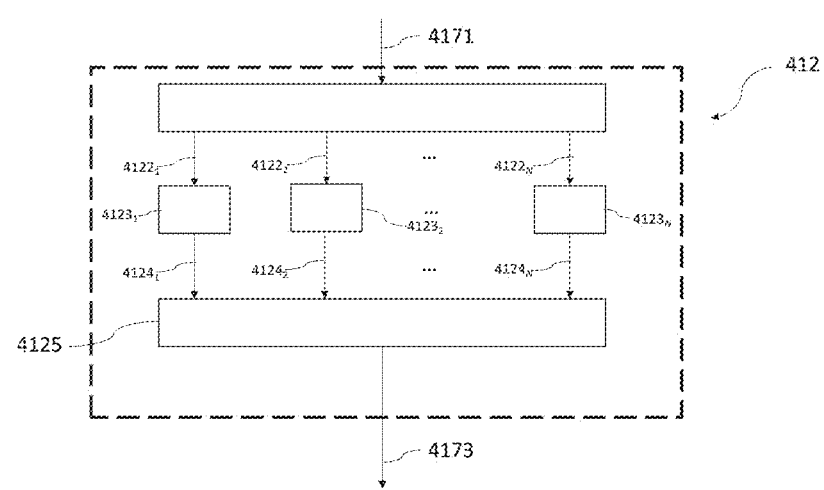
FIG. 4 represents a schematic view of a semantic branch in the anomaly detection system.

FIG. 4 represents a schematic view of a semantic branch 412. The semantic branch 412 receives a text content 4171 of the batch of N log messages 314. The text content 4171 is split into N text fragments $4122_1, 4122_2, \ldots, 4122_N$, each of the N text fragments corresponding to one of the N log messages with the numeric attributes removed.

The N text fragments $4122_1, 4122_2, \ldots, 4122_N$, are processed by semantic embedding units $4123_1, 4123_2, \ldots, 4123_N$, the semantic embedding units $4123_1, 4123_2, \ldots, 4123_N$, computing elementary semantic embedding vectors $4124_1, 4124_2, \ldots, 4124_N$.

A combination unit 4125 combines the elementary semantic embedding vectors $4124_1, 4124_2, \ldots, 4124_N$ into a final semantic embedding vector, using a combination operation. The combination operation may be chosen, among others, among a sum, a weighted sum, an arithmetic average, a geometric average, a harmonic average, a quadratic average and a concatenation.

The elementary semantic embedding vectors $4124_1, 4124_2, \ldots, 4124_N$ are high-dimensional numerical vectors such that semantic relationships between words are preserved and that words with similar meanings have similar encodings. The elementary semantic embedding vectors have an identical number of dimensions, the identical number of dimensions being a parameter which can be tuned. According to an embodiment, the elementary semantic embedding vectors $4124_1, 4124_2, \ldots, 4124_N$ have a predefined dimension selected between 100 and 300.

The semantic embedding units $4123_1, 4123_2, \ldots, 4123_N$ may rely on a semantic embedding model to compute the elementary semantic embedding vectors $4124_1, 4124_2, \ldots, 4124_N$.

The semantic embedding model is pre-trained on a training dataset of natural language before being used in the semantic embedding units $4123_1, 4123_2, \ldots, 4123_N$. The semantic embedding model may be trained on an open-source corpus in English. According to another embodiment, the semantic embedding model may also be trained on a training dataset of log messages.

Examples of a semantic embedding model suitable for this application comprise word2vec and Bidirectional Encoder Representations from Transformers.

Figure 5:
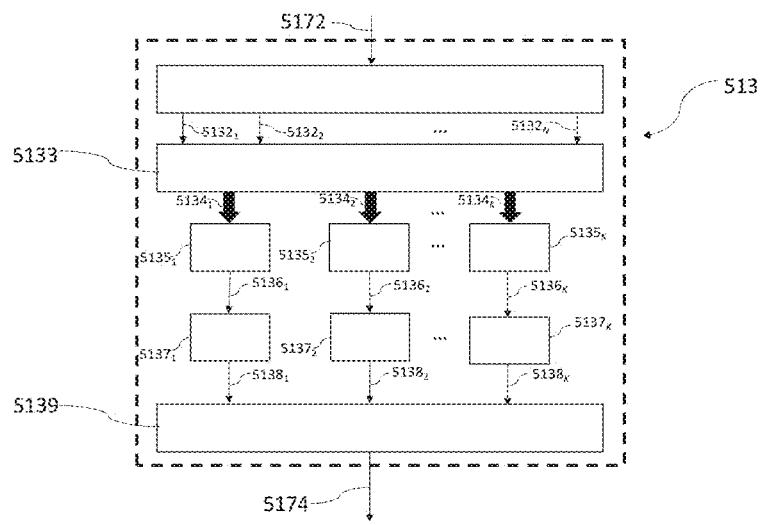
FIG. 5 represents a schematic view of a numeric branch in the anomaly detection system.

FIG. 5 represents a schematic view of a numeric branch 513. Numeric attributes 5172 extracted from the batch of N log messages 314 are given as input to the numeric branch 513.

Lists of numeric attributes $5132_1, 5132_2, \ldots, 5132_N$ are transmitted to a clustering unit 5133. The lists of numeric attributes $5132_1, 5132_2, \ldots, 5132_N$ correspond to the numeric attributes in each log message of the batch of N log messages 314. Each of the lists of numeric attributes $5132_1, 5132_2, \ldots, 5132_N$ is ordered such that numbers within each of the lists of numeric attributes $5132_1, 5132_2, \ldots, 5132_N$ are ordered in accordance with their order of appearance within one log message of the batch of N log messages.

The clustering unit 5133 groups the lists of numeric attributes $5132_1, 5132_2, \ldots, 5132_N$ into K clusters $5134_1, 5134_2, \ldots, 5134_K$. Elements in each of the K clusters have the same number of numeric attributes. According to an embodiment, the K clusters are chosen according to a text content in each of the batch of N log messages 314, such that the elements in each of the K clusters correspond to messages with identical text contents and an identical number of numeric attributes.

According to an embodiment, additional numeric attributes may be derived from the log messages and added to the lists of numeric attributes $5132_1, 5132_2, \ldots, 5132_N$. Examples of the additional numeric attributes comprise: a time difference between two log messages of the batch of N log messages 314, the two log messages being consecutive or not; a message intensity, the message intensity being a number of times a given message has appeared in a given time window; or a keyword tracker, the keyword tracker having a value of 0 or 1 depending on whether a given keyword appeared in one of the batch of N log messages 314. Examples of the given keyword comprise "fatal", "error" and "exception".

The additional numeric attributes are computed cluster by cluster. Some of the K clusters may not have any additional numeric attributes and two of the K clusters may not have the same number of additional numeric attributes, or the same additional numeric attributes.

The additional numeric attributes are then appended to the lists of numeric attributes $5132_1, 5132_2, \ldots, 5132_N$ within each of the K clusters $5134_1, 5134_2, \ldots, 5134_K$. The numeric attributes and the additional numeric attributes are then processed indiscriminately.

The K clusters $5134_1, 5134_2, \ldots, 5134_K$ are then processed by K averaging units $5135_1, 5135_2, \ldots, 5135_K$. The K averaging units $5135_1, 5135_2, \ldots, 5135_K$ compute average lists $5136_1, 5136_2, \ldots, 5136_K$ for each of the K clusters $5134_1, 5134_2, \ldots, 5134_K$.

The average lists $5136_1, 5136_2, \ldots, 5136_K$ are computed by performing an average of each numeric attribute over all lists of numeric attributes within each of the K clusters $5134_1, 5134_2, \ldots, 5134_K$. Thus, the average list $5136_1$, (respectively $5136_2, \ldots, 5136_K$) has the same dimension as the lists of numeric attributes in the cluster $5134_1$ (respectively $5134_2, \ldots, 5134_K$). The average list $5136_1$, (respectively $5136_2, \ldots, 5136_K$) is a coordinate-by-coordinate average of the lists of numeric attributes in the cluster $5134_1$ (respectively $5134_2, \ldots, 5134_K$). Coordinate-by-coordinate averaging means that the numeric attributes having a same position or rank within all the lists of numeric attributes in the cluster are averaged to a single, average value According to other embodiments, the average lists $5136_1, 5136_2, \ldots, 5136_K$ may be computed using a coordinate-by-coordinate sum, weighted sum, arithmetic average, geometric average, harmonic average or quadratic average of the elements in the K clusters $5134_1, 5134_2, \ldots, 5134_K$. The average lists $5136_1, 5136_2, \ldots, 5136_K$ are then processed by encoding units $5137_1, 5137_2, \ldots, 5137_K$. The encoding units $5137_1, 5137_2, \ldots, 5137_K$ compute elementary encoding vectors $5138_1, 5138_2, \ldots, 5138_K$.

The elementary encoding vectors $5138_1, 5138_2, \ldots, 5138_K$ are high-dimensional numeric vectors whose coordinates are based on the values of each coordinate in the average lists $5136_1, 5136_2, \ldots, 5136_K$ and on the position or rank of each coordinate within the average lists $5136_1, 5136_2, \ldots, 5136_K$.

The elementary encoding vectors $5138_1, 5138_2, \ldots, 5138_K$ are then combined by a numeric combination unit 5139, the numeric combination unit 5139 outputting a final encoding vector 5174. The elementary encoding vectors $5138_1, 5138_2, \ldots, 5138_K$ have the same dimension and may for example be summed or averaged by the numeric combination unit 5139.

Figure 6:
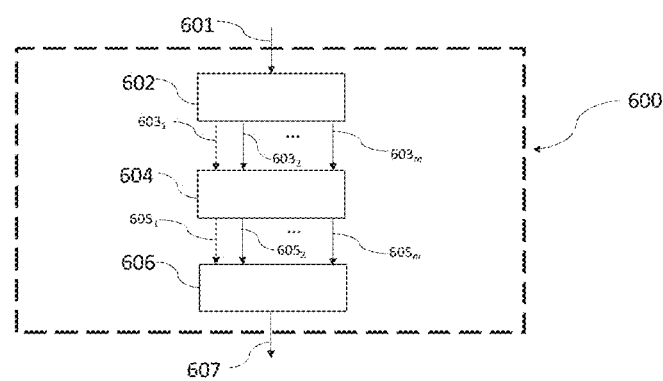
FIG. 6 represents a schematic view of an encoding unit in the numeric branch.

FIG. 6 represents a schematic view of an encoding unit 600. The encoding unit receives an average list 601, the average list 601 comprising m average values of m numeric attributes within a given cluster.

Each of the m average values is then turned into a high dimensional vector representing a respective numeric attribute, using a conversion in polar coordinates, resulting in m average vectors $603_1, 603_2, \ldots, 603_m$. The m average vectors $603_1, 603_2, \ldots, 603_m$ all have the same dimension.

The conversion in polar coordinates of a numeric value x comprises a step of computing an angular value θ from the numeric value x and a range s, the range s corresponding to a maximum possible value of the numeric value x. The range s can be computed by comparing values of the numeric value x or can be a hard-coded variable. According to an embodiment, the angular value θ is comprised between 0 and π. According to an embodiment, the angular value θ may be linearly linked to the numeric value x, for example using the following formula:

$$\theta = \frac{\pi x}{s}$$

A number of dimensions D may be chosen in order to turn the angular value θ into a vector v of dimension D. The i-th coordinate of the vector v may be computed as follows:

$$v_i = \begin{cases} \sin^{d-1}(\theta)\cos(\theta), & i < D \\ \sin(\theta)^D, & i = D \end{cases}$$

According to an embodiment, D may be equal to 2. D may also be an arbitrary high number.

The m average vectors $603_1, 603_2, \ldots, 603_m$ are then transmitted to a positional encoding unit 604. The positional encoding unit 604 modifies the coordinates of the m average vectors $603_1, 603_2, \ldots, 603_m$ based on the respective position or rank 1, ..., m of the respective numeric attribute in the average list 601. The positional encoding unit 604 thus outputs positionally-encoded vectors $605_1, 605_2, \ldots, 605_m$.

Two embodiments of the positional encoding unit 604 are now described. According to an embodiment, an $i^{th}$ coordinate of an $l^{th}$ positionally-encoded vector $604_l$ may be computed by multiplying an $i^{th}$ coordinate of an $l^{th}$ average vector $605_l$ by a factor $\varepsilon_{i,l}$, the factor $\varepsilon_{i,l}$ being a function of an index i of the coordinate and a rank l of the average vector. According to an embodiment, the factor $\varepsilon_{i,l}$ is computed as follows:

$$\varepsilon_{i,l} = \begin{cases} \sin\left(\dfrac{l}{10000^{\frac{i}{d}}}\right) & \text{if } i \text{ is even} \\ \cos\left(\dfrac{l}{10000^{\frac{i-1}{d}}}\right) & \text{if } i \text{ is odd} \end{cases}$$

According to another embodiment, the positionally-encoded vectors $605_1, 605_2, \ldots, 605_m$ are computed by multiplying the average vectors $603_1, 603_2, \ldots, 603_m$ by predefined orthogonal matrices, respectively $Q_1, Q_2, \ldots, Q_m$.

The orthogonal matrices $Q_1, Q_2, \ldots, Q_m$ are associated respectively with a rank 1 to m of the numeric attribute in the lists of numeric attributes of a given cluster, and are produced by computing the QR decomposition of arbitrarily chosen matrices $R_1, R_2, \ldots, R_m$. Row vectors of the orthogonal matrices $Q_1, Q_2, \ldots, Q_m$ produce an orthonormal basis.

The orthogonal matrices $Q_1, Q_2, \ldots, Q_m$ are incorporated in the positional encoding unit 604.

The orthogonal matrices $Q_1, Q_2, \ldots, Q_m$ are multiplied with the average vectors $603_1, 603_2, \ldots, 603_m$ respectively in order to obtain the positionally encoded vectors $605_1, 605_2, \ldots, 605_m$ respectively.

The positionally-encoded vectors $605_1, 605_2, \ldots, 605_m$ are then combined ( ) into an elementary encoding vector 607. The combining of positionally-encoded vectors $605_1, 605_2, \ldots, 605_m$ may be for example a sum, a weighted sum, an arithmetic average, a geometric average, a quadratic average, a harmonic average or a concatenation.

A plurality of elementary encoding vectors are then combined into a combined encoding vector. The combined encoding vector is then combined with the final semantic embedding vector into a final encoding vector.

Figure 7:
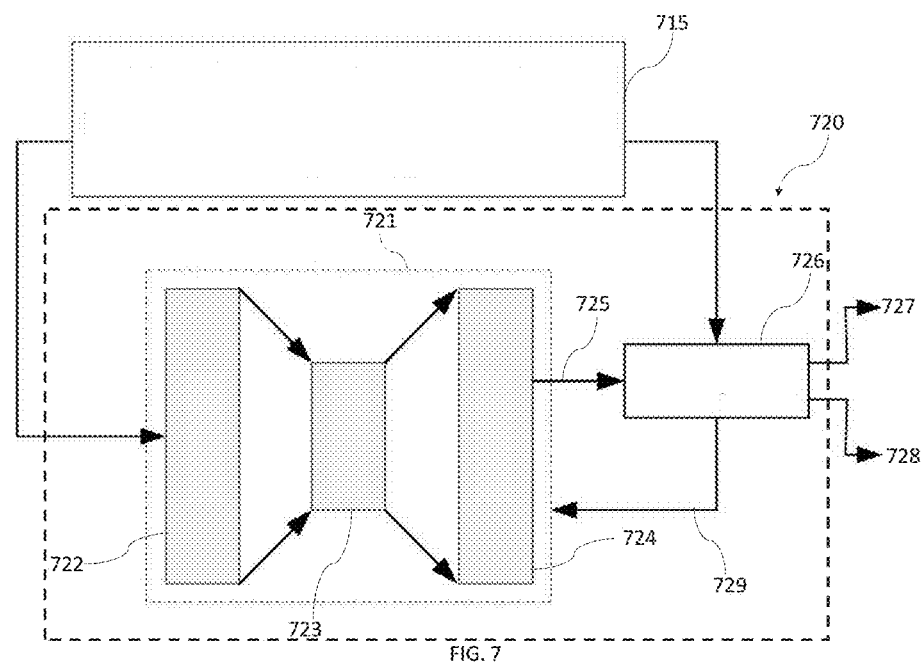
FIG. 7 is a view of the anomaly detection system according to an embodiment.

FIG. 7 represents a schematic representation of an anomaly detection unit 720. The anomaly detection unit 620 comprises an autoencoder 721.

The autoencoder 721 is an artificial neural network architecture which has an hourglass part. The autoencoder 721 takes an input 715, the input 715 being a final encoding vector computed by the data processing unit.

The autoencoder 721 comprises a set of encoding layers 722 and a set of decoding layers 724. The set of encoding layers 722 takes the input 715 and computes a code 723, the code 723 being a low-dimensional representation of the input 715.

The set of decoding layers 724 uses the code 723 to compute an output 725. A comparison unit 726 then computes a reconstruction loss, the reconstruction loss measuring a difference between the input 715 and the output 725, the reconstruction loss being small when the output 725 is close to the input 715.

During training only, a backpropagation step 729 is carried out. During training, the autoencoder is fed encoding vectors computed using a training dataset of log messages. Weights of the autoencoder are updated based on the reconstruction loss.

During inference, the reconstruction loss is compared with a predefined anomaly threshold. If the reconstruction loss exceeds the predefined anomaly threshold, an anomaly is considered to be detected and the anomaly detection unit 720 returns a positive anomaly signal 727.

If the reconstruction loss is below the predefined anomaly threshold, no anomaly is deemed to be detected and a negative anomaly signal 728 is returned by the anomaly detection unit 720.

Figure 8:
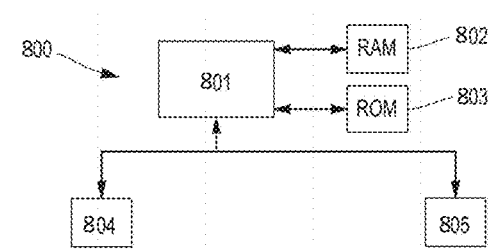
FIG. 8 is a functional diagram of a programmed computer in which example embodiments of the invention may be implemented.

FIG. 8 shows a functional diagram of a programmed computer, server, circuitry, or apparatus 800 that may be used for implementing the above-described anomaly detection apparatus. Computer 800 has a core and several peripherals connected via a communication bus. The major components of the core are a microprocessor 801 (often called the CPU) random access memory (RAM) 802 and read only memory (ROM) 803. The peripherals comprise devices that allow information to be input to the system from users, output to users and stored and retrieved (mass storage devices 804 such as hard disks and network interfaces 805).

The invention is not limited to the described example embodiments. The appended claims are to be construed as embodying all modifications and alternative constructions that may occur to one skilled in the art, and which fairly fall within the basic teaching as set forth herein.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Elements such as the apparatus and its components could be or include e.g. hardware means like e.g. an Application-Specific Integrated Circuit (ASIC), or a combination of hardware and software means, e.g. an ASIC and a Field-Programmable Gate Array (FPGA), or at least one microprocessor and at least one memory with software modules located therein, e.g. a programmed computer.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The example embodiments may be implemented by means of hardware as well as software. The same item of hardware may represent several "means".

In the claims, any reference signs placed between parentheses shall not be construed as limiting the scope of the claims.

The invention claimed is:

1. An apparatus to detect anomalies, the apparatus comprising:
   an anomaly detection module;
   at least one processor; and
   at least one memory storing instructions that, when executed by the at least one processor, cause the apparatus at least to perform,
   collecting a plurality of log messages from a data processing system, the plurality of log messages reporting events that occur as the data processing system operates, the plurality of log messages comprising textual content and numeric attributes;
   classifying the plurality of log messages into a plurality of clusters as a first function of a number of the numeric attributes in the plurality of log messages, such that the plurality of log messages within a cluster have a given number of the numeric attributes;
   for at least one of the clusters, computing at least one encoding vector associated to a numeric attribute, wherein the at least one encoding vector is computed as a second function of a representative value of the numeric attribute across the plurality of log messages within the cluster and of a rank of the numeric attribute, wherein the rank is representative of an order of the numeric attribute within the given number of the numeric attributes of the plurality of log messages within the cluster;

computing a combined semantic embedding vector from textual contents of the plurality of log messages;

combining the at least one encoding vector with the combined semantic embedding vector into a final encoding vector; and feeding the final encoding vector to the anomaly detection module configured to detect an anomaly in the data processing system.

2. The apparatus according to claim 1, wherein the apparatus is further caused to perform:
computing the at least one encoding vector associated to the numeric attribute for the plurality of clusters.

3. The apparatus according to claim 1, wherein the apparatus is further caused to perform:
computing a plurality of encoding vectors associated to a plurality of the numeric attributes for the at least one of the clusters.

4. The apparatus according to claim 3, wherein the apparatus is further caused to perform:
combining the plurality of encoding vectors with the combined semantic embedding vector into the final encoding vector.

5. The apparatus according to claim 1, wherein the apparatus is further caused to perform:
computing at least one additional numeric attribute from the plurality of log messages of the at least one of the clusters;
appending the at least one additional numeric attribute to the numeric attributes within the at least one of the clusters; and
increasing the given number of the numeric attributes of the plurality of log messages within the cluster.

6. The apparatus according to claim 1, wherein the apparatus is further caused to compute the plurality of clusters as a third function of the textual contents in the plurality of log messages.

7. The apparatus according to claim 1, wherein the apparatus is further caused to perform:
computing a plurality of semantic embedding vectors from the textual contents; and
combining the plurality of semantic embedding vectors into the combined semantic embedding vector.

8. The apparatus according to claim 1, wherein the apparatus is further caused to convert a plurality of average values into high dimensional polar coordinates.

9. The apparatus according to claim 1, wherein the apparatus is further caused to,
compute an intermediate encoding vector from the representative value of the numeric attribute;
select a projection vector within a basis of orthogonal vectors as a third function of the rank of the numeric attribute; and
compute the at least one encoding vector by projecting the intermediate encoding vector on the projection vector.

10. The apparatus according to claim 1, wherein the apparatus is further caused to,
compute a transitional encoding vector from the representative value of the numeric attribute; and
multiply at least one coordinate of the transitional encoding vector by a factor depending on an index of the at least one coordinate and the rank of the numeric attribute.

11. The apparatus according to claim 1, wherein the apparatus is further caused to perform:
returning an anomaly detection signal to the data processing system in order to cause a corrective action in the data processing system, the anomaly detection signal being computed by the anomaly detection module.

12. The apparatus according to claim 1, wherein the anomaly detection module is an autoencoder.

13. The apparatus according to claim 12, wherein the apparatus is further caused to perform:
receiving a reconstruction loss computed by the autoencoder; and
classifying a value of the reconstruction loss higher than an anomaly threshold as an anomaly.

14. The apparatus according to claim 1, wherein the apparatus is further caused to perform:
training the anomaly detection module using a plurality of training encoding vectors, the plurality of training encoding vectors being computed from a training dataset of log messages.

15. A method of operating an apparatus for anomaly detection, the method comprising:
collecting a plurality of log messages from a data processing system, the plurality of log messages reporting events that occur as the data processing system operates, the plurality of log messages comprising textual content and numeric attributes;
classifying the plurality of log messages into a plurality of clusters as a first function of a number of the numeric attributes in the plurality of log messages, such that the plurality of log messages within a cluster have a given number of the numeric attributes;
for at least one of the clusters, computing at least one encoding vector associated to a numeric attribute, wherein the at least one encoding vector is computed as a second function of a representative value of the numeric attribute across the plurality of log messages within the cluster and of a rank of the numeric attribute, wherein the rank is representative of an order of the numeric attribute within the given number of the numeric attributes of the plurality of log messages within the cluster;
computing a combined semantic embedding vector from textual contents of the plurality of log messages;
combining the at least one encoding vector with the combined semantic embedding vector into a final encoding vector; and
feeding the final encoding vector to an anomaly detection module of the apparatus, the anomaly detection module configured to detect an anomaly in the data processing system.

16. The method according to claim 15, further comprising returning an anomaly detection signal representing the anomaly.

17. The method according to claim 16, further comprising performing corrective action as a third function of the anomaly detection signal.

18. The method according to claim 17, wherein the corrective action is performed in the data processing system.

* * * * *